United States Patent [19]

Nagamura

[11] 3,987,256

[45] Oct. 19, 1976

[54] GROOVED RECORD PLAYBACK SYSTEM WITH MULTIPLE TRANSDUCERS

[76] Inventor: Fumitaka Nagamura, 1-6-14 Tomigaya, Shibuya, Tokyo, Japan

[22] Filed: Mar. 20, 1974

[21] Appl. No.: 452,989

Related U.S. Application Data

[63] Continuation-in-part of Ser. No. 368,969, June 11, 1973, abandoned.

[52] U.S. Cl. .................. 179/100.4 ST; 179/1 GQ; 179/100.4 A; 179/100.41 K
[51] Int. Cl.² .................. G11B 3/44; H04R 5/00
[58] Field of Search .................. 360/25, 26; 179/100.4 A, 100.4 C, 100.4 ST, 100.41 R, 100.41 B, 100.41 P, 100.41 K, 100.41 S, 1 GQ

[56] References Cited

UNITED STATES PATENTS

| | | | |
|---|---|---|---|
| 3,118,977 | 1/1964 | Olson | 179/100.1 TD |
| 3,463,889 | 8/1969 | Ahrens | 179/100.41 K |
| 3,686,471 | 8/1972 | Takahashi | 179/100.1 TD |
| 3,687,461 | 8/1972 | Kamiya | 179/100.41 K |
| 3,691,316 | 9/1972 | Oda et al. | 179/100.41 K |
| 3,710,034 | 1/1973 | Murry | 179/100.4 ST |
| 3,777,076 | 12/1973 | Takahashi | 179/100.4 ST |
| 3,786,193 | 1/1974 | Tsurushima | 179/100.4 ST |

FOREIGN PATENTS OR APPLICATIONS 653,147 2/1963 Italy .................. 179/100.41 K

OTHER PUBLICATIONS

"On the Discrete 4 Channel Disc CD4," HiFi Equipment, 1972, pp. 14–25.

*Primary Examiner*—Bernard Konick
*Assistant Examiner*—Jay P. Lucas
*Attorney, Agent, or Firm*—Wallenstein, Spangenberg, Hattis & Strampel

[57] ABSTRACT

Reproducing cartridge apparatus for producing preferably at least three and most advantageously four channels of electrical signals from a multi-channel signal containing grooved record where the sides of the groove are oriented at angles of 45° from the vertical, said reproducing apparatus comprising a stylus adapted to extend into the record groove, at least three and preferably four transducers mounted in spaced angular relationship to one another and responsive to movement of the stylus in various directions for producing electrical signals indicative of the directions of movement imparted to the said stylus as the stylus rides in the record groove. The transducers have main detecting axes spaced in different directions along which axes they are responsive to a maximum degree to movement of the stylus.

29 Claims, 39 Drawing Figures

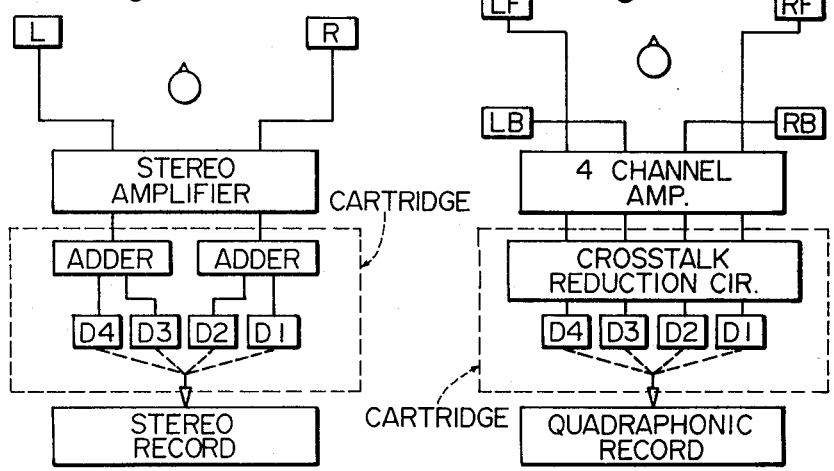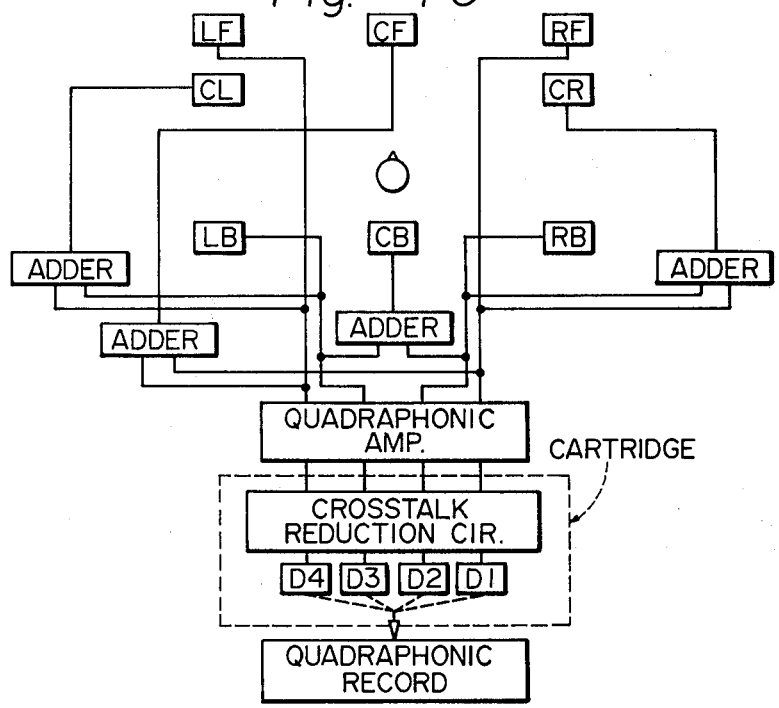

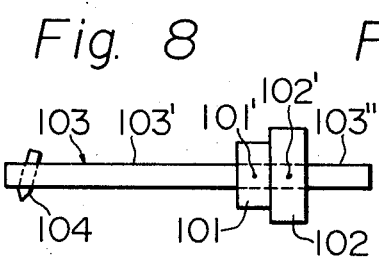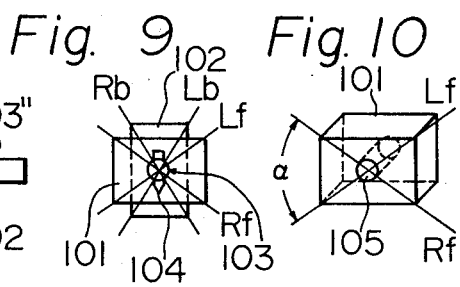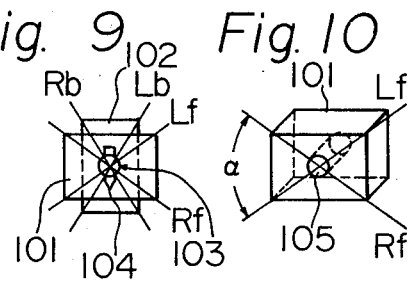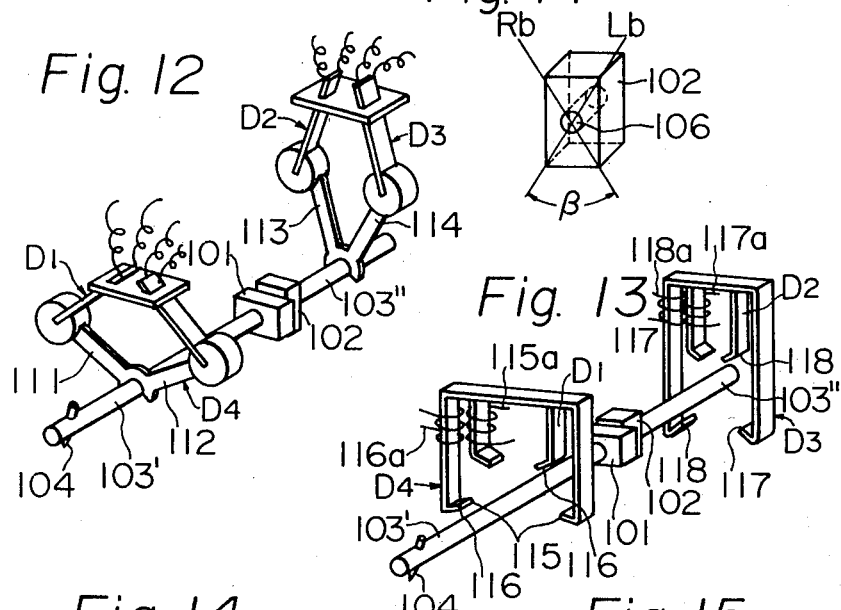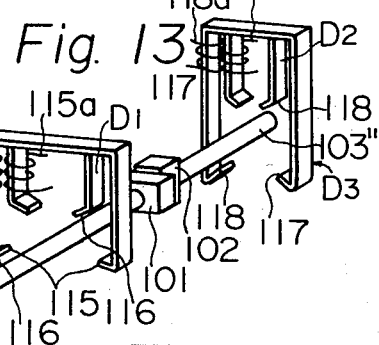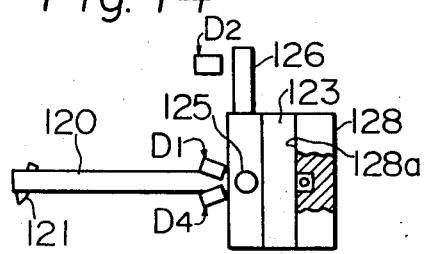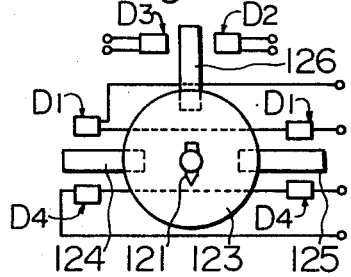

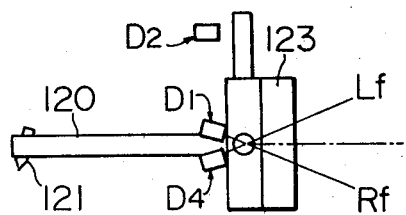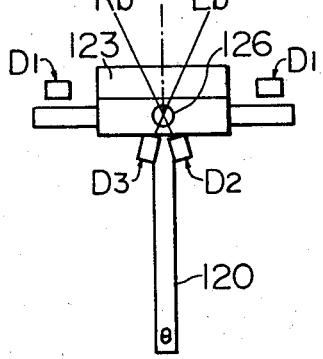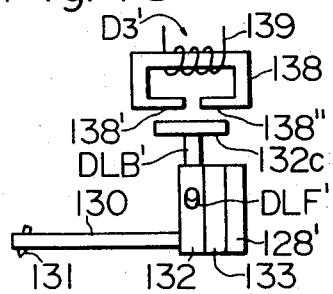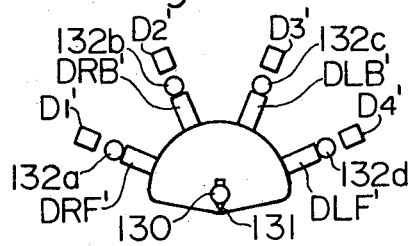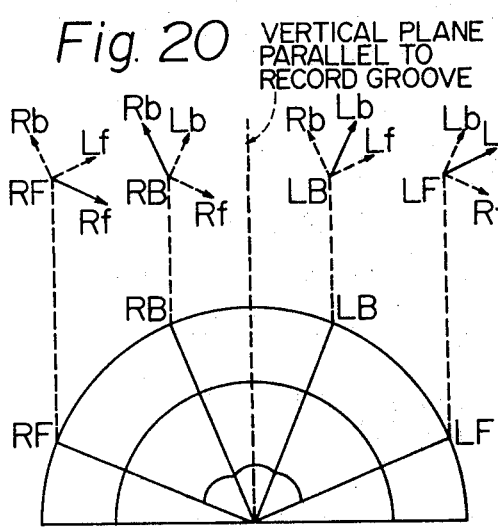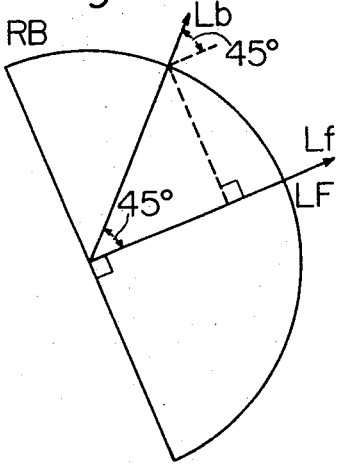

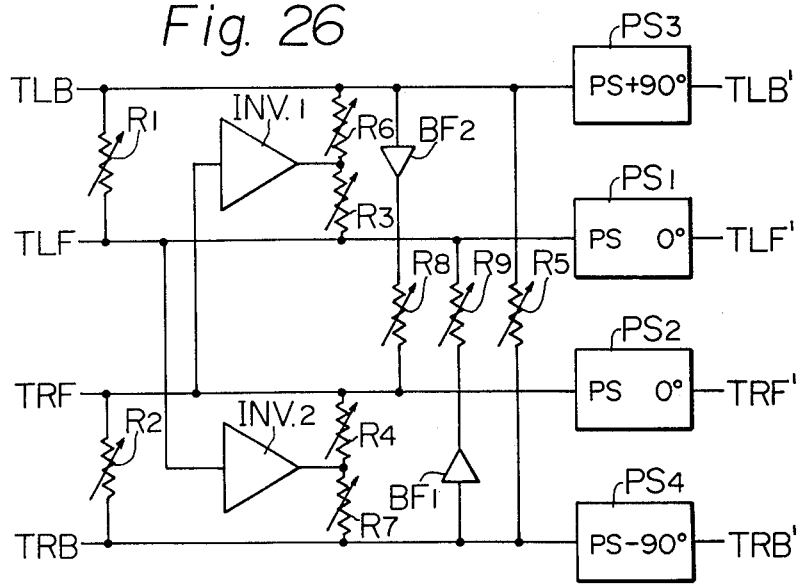
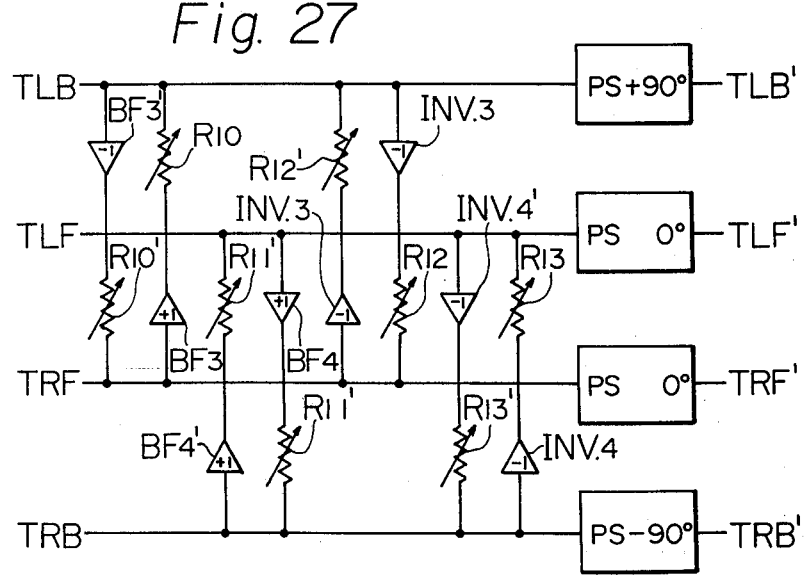

GROOVED RECORD PLAYBACK SYSTEM WITH MULTIPLE TRANSDUCERS

This applicaton is a continuation-in-part application of Ser. No. 368,969, filed June 11, 1973 now abandoned.

This invention relates to a system for recording and reproduction of multi-channel audio information in general, and, in particular, to a system for recording and reproduction of multi-channel audio information by the use of discs as recording media for such information.

Information recorded on discs by the so-called 45-45° system, wherein the recorded information in reproduction is detected along two axes removed 45° in angle to the left and right of the normal axis perpendicular to the face of the disc can be made by appropriate interrelation between the disc cutting tip and the sound groove track to be recorded on the disc, to cause such motions of the stylus tip as are represented by vectors with two detection axes. Further, such vectors in reproduction are detected as vector projections on the two detection axes, and then processed through separate electronic means interrelated to the detection axes via electromechanical transducers, to drive spatial sound field reproducing means, i.e. loudspeakers, and establish the so-called sound field localization in the space between the loudspeakers.

Lately, for various sound effects in multi-channel reproduction, much use has been made of mobility of the cutter tip which, in response to information to be written in, can be moved in any direction, i.e. 360°, within a predetermined flat plane that includes the engaged position of the cutter tip when it is engaged with the disc to make a recorded track of information in the form of a sound groove. However, conventional technology depends for direct detection of multi-channel information on only two axes of detection, as in the above-mentioned 45-45 system, so that feeding different signals to three or more loudspeakers necessitates additional electronic circuitry to synthesize multi-channel information from signals obtained through electromechanical detecting means individually related to the said two detection axes, and creates problems of crosstalk among these multi-channels of information.

Thus, the object of this invention lies in optimally resolving such disadvantages of conventional technology as referred to hereinabove.

In one of the aspects of this invention, at least three separate component vectors of the motion of the stylus tip tracing the sound groove track of a recorded disc, are detected separately and independently, converted electromechanically to a corresponding number of electric signals, and passed through separate, conventional processing means, such as amplifiers for boosting the resulting respective electrical signals to drive corresponding loudspeakers. More specifically, the detection of component vectors of the stylus tip motion is not restricted to detection along the two main detection axes of the 45-45° system referred to above, but are detected by detecting means respectively responsive to a maximum degree to motional vectors extending respectively in directions spaced less than 90° from each other and progressively in decreasing degress in directions on opposite sides to the maximum response directions or axes. The number of detecting means and the axes along which they are most responsive may correspond to the number of sound pick-up locators used in an original recording process where more than two signal channels are recorded. Thus, a pick-up cartridge of the present invention to be capable of operating with a record disc having signals recorded from a quadraphonic system placement of microphones, would include four motional vector responsive transducers responsive to a maximum degree along four respective axes spaced less than 90° apart, preferably 45° apart. Such a cartridge is useful in playing stereo records as well by combining the four outputs of the cartridge to add together the right and left channel signals.

The above is based on the discovery that, even in the conventional disc cutting under the 45-45° system, using signals transmitted through two separate channels after combining in a prescribed manner, such original signals as derived acoustically from sound sources in three or more various locations, motion of the cutter tip still expresses all of the original signals separately. Therefore, according to this invention, original signals can be more directly reproduced than by the two direction detection of the conventional 45-45° system and will produce for stereo and three or more channel records improved channel separation among other advantages to be described.

The stylus motion detecting transducers of the conventional cartridge are arranged to detect stylus motion principally occurring in a single transverse vertical plane transverse to the record groove and are centered in such a plane. The three or more transducers of the cartridge just described can be centered in one or more parallel transverse vertical planes. However, another aspect of this invention is that by expanding the principle of this invention pertaining to the ability of the cutter tip motion on one sound track to carry simultaneously at least three different acoustical channels of information, the transducers can be centered along any non-parallel planes where they can detect the stylus motion vectors which extend in all directions and planes, in addition to the transverse vertical plane or planes referred to above. Such a multiplanar arrangement of transducers provides for even a greater channel separation.

In accordance with another aspect of this invention, to further increase channel separation, the sensitivity curve of the stylus motion detecting transducers are modified from the more common generally circular configuration to one resembling a narrow elongated cigar-shaped pattern by special design techniques applied to the construction of the detecting means. One such technique involves adding dampers to the stylus carrying arm in a manner to be explained. This technique also improves channel separation when applied to conventional stereo cartridges using only two orthogonally related transducers.

The stylus is generally connected to a cantilevered arm and other vibrating structure which can generate what is referred to as crosstalk error motion components which, although modest in the present invention, is preferably substantially reduced or eliminated. These original crosstalk error motions have been found to cause error signals in each transducer which are either in phase or 180° out of phase with the original signal generated in the contiguous transducers. In accordance with one aspect of the invention, crosstalk reduction or elimination is effected by adding to or subtracting from the output of each transducer a portion of the main transducer output signal of the adjacent transducer to cancel or reduce the crosstalk signals thereon. Thus, in the output of the front speaker driving transducers the crosstalk and original signals are in phase, so phase inverters and inter-channel coupling resistors therebetween effects crosstalk reduction. In the output of the rear speaker driving transducers the crosstalk and original signals are 180° out-of-phase so an inter-channel coupling resistor therebetween effects cross-talk reduction. The relationship between the original and crosstalk signals in the right front and right rear and the left front and left rear speaker driving transducers are likewise out-of-phase so inter-channel coupling resistors will reduce the crosstalk signals therein. The corresponding crosstalk components in the outputs of diagonally related transducers are either in or 180° out-of-phase and thus can be reduced by uses of coupling resistors alone or with inverters connected therebetween.

Cartridges constructed in accordance with the present invention (in some cases without a crosstalk reducing circuit and in some cases with a crosstalk reducing circuit) produce overall results which are a marked improvement over playback systems of the prior art. In the first place, in cartridges having three or more transducers, preferably at least four transducers, oriented along different main detecting axes as described, on a cartridge by cartridge comparison basis, improvements are found in one or more catagories of frequency and dynamic range, linearity, stability, noise and distortion level, signal separation and cost. Moreover, in overall compatibility with various recording systems, the present cartridge is equal to or superior to all other cartridges, so that the present cartridges can be used effectively with record discs of all types. In the one example where operating results are comparable, the present cartridge is materially less costly to manufacture than the cartridge involved.

While the present invention primarily deals with a cartridge having three or more transducers oriented along three or more transducers oriented along three or more different main detecting axes as described, two features of the present invention are also applicable singly or in combination to conventional two transducer stereo cartridges, one of which features being that the conventional circular lobed stylus motion vector angle versus transducer output characteristic thereof is reduced in width only on the side thereof nearest the vertical. Signal separation is thereby improved and also the ability of the cartridge to reproduce at lower more realistic levels signals directed from the rear of a room where the recording has been made. The second feature referred to is to vary the usual 90° spacing of the two stereo transducers symmetrically positioned on opposite sides of a vertical plane extending parallel to the record groove to one much less than 90° such as 45'.

Figure 2:
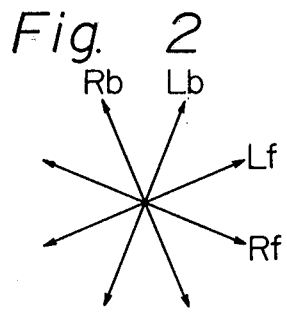
FIG. 2 is a diagram of the record groove cutting angles at which the preferred quadraphonic cartridge of the present invention has maximum response.
Figure 2:
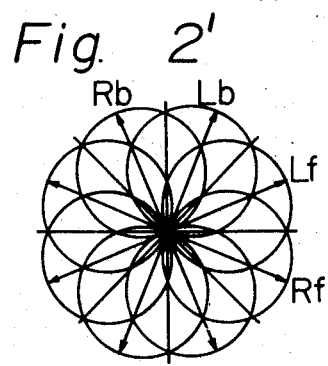
Figure 3:
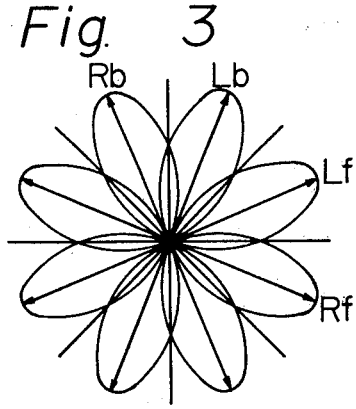
Figure 22:
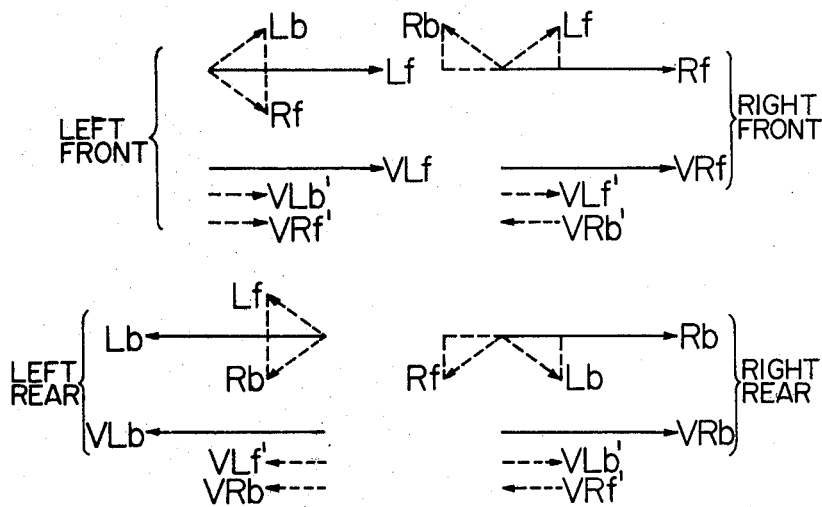
Figure 23:
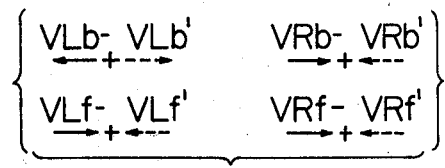
Figure 24:
Figure 25:
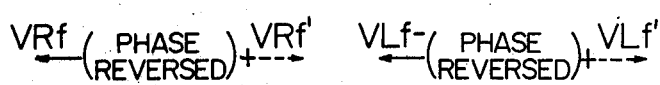

FIG. 2' shows the sensitivity response characteristic of a four channel, four transducer quadraphonic cartridge of the invention where the transducer responses have an undesirable generally circle configuration;

FIG. 3 shows the idealized sensitivity response characteristic of a four transducer quadraphonic cartridge of the invention where the transducer responses have an elongated or cigar-shaped configuration;

FIG. 4–7 illustrate various stylus motion vector and transducer placement and sensitivity angles useful in understanding the operation of the four transducer quadraphonic cartridge embodiment of the invention;

FIG. 7A illustrates the four transducer quadraphonic cartridge of the invention used in a stereo playback system, the cartridge being switched into a stereo mode of operation which inserts adder circuits between the outputs of the right front-rear and left front-rear transducer pairs;

FIG. 7B illustrates the same four transducer quadraphonic cartridge of the invention shown in FIG. 7A used in a quadraphonic playback system, the cartridge being switched into its quadraphonic mode of operation which inserts a crosstalk reduction circuit into the four channel outputs thereof;

FIG. 7C illustrates the quadraphonic cartridge of the invention in its quadraphonic mode of operation like that shown in FIG. 7B, but with the output of the accompanying four channel amplifier connected through adder circuits to center positioned front, rear, right and left side speakers and directly to the right and left front and right and left rear speakers, to form an 8 channel sound system;

FIG. 8 is a side elevational view of a stylus carrying arm of one form of quadraphonic cartridge of the invention, the arm being mounted in a stationary damper assembly for damped movement along two orthogonal axes, to produce an elongated sensitivity characteristic like that shown in FIG. 3 when associated with four motion responsive transducers like that shown in FIGS. 12 and 13;

FIG. 9 is a front elevational view of the stylus carrying arm of FIG. 8, with various stylus motion vector axes LF, RF, RB, LB indicated thereon corresponding to the main sensitivity or detecting axes of the transducers used therewith;

FIG. 10 is a front perspective view of the front section of the damper assembly shown in FIGS. 8 and 9, with the LF and RF axes indicated thereon;

FIG. 11 is a front perspective view of the rear section of the damper assembly shown in FIGS. 8 and 9, with the RB and LB axes indicated thereon;

FIGS. 12 and 13 respectively illustrate perspective views of the damped stylus carrying arm of FIGS. 8–11, with direct connected piezoelectric and spatially related magnetic transducers associated therewith;

FIG. 14 is a side elevational view, partly broken away, of the structure of a second form of quadraphonic cartridge where the stylus motion is converted into a pivoted motion of a support member carrying vertical and horizontal transducer operating projections which flex in a circumferential or lateral direction, the transducers which respond to such flexing being diagrammatically indicated by bases;

FIG. 15 is a front elevational view of the cartridge structure shown in FIG. 14;

FIG. 16 is a view corresponding to FIG. 14 and shows the main detecting axes LF and RF of the transducers associated with the horizontal projections;

FIG. 17 is a top plane view of the cartridge structure shown in FIGS. 14–16 and shows the main detecting axes Rb and Lb of the transducers associated with the vertical projection;

FIG. 18 is a side elevational view, partly broken away, of the structure of a third form of quadraphonic cartridge, where a stylus carrying support member has radially moving transducer operating projections, the transducers which respond to such radial movement being diagrammatically indicated by boxes;

FIG. 19 is a front elevational view of the cartridge structure of FIG. 18;

FIGS. 20 and 21 show the original and primary crosstalk motion vectors imparted to the transducer operating elements of the cartridge structure of FIGS. 18 and 19 (or other quadraphonic cartridges of the invention);

FIG. 22 shows the various groups of original and primary crosstalk motion vectors of FIG. 20 and the corresponding transducer signals penetrated thereby;

FIGS. 23–25 show various crosstalk reducing or cancelling voltages derived from corresponding original and crosstalk signals shown in FIG. 20;

FIG. 26 is a circuit which performs the crosstalk reducing operations illustrated in FIGS. 22–25.

FIG. 27 is another circuit for reducing crosstalk signals by a different form of signal intermixing than that shown in FIGS. 23–25.

Figure 28:
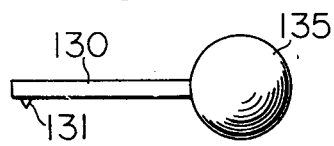
Figure 29:
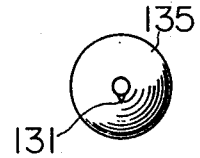
Figure 30:
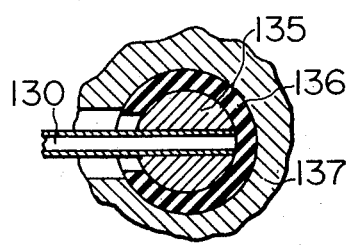
Figure 31:
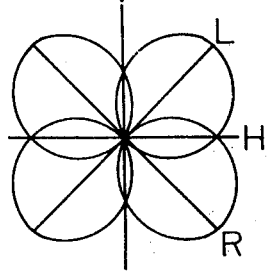
Figure 32:
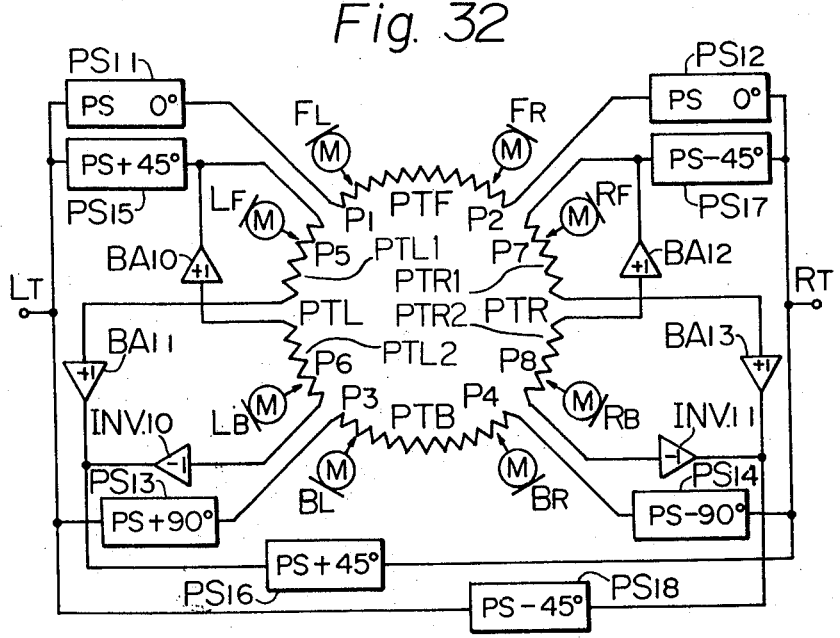
Figure 33:
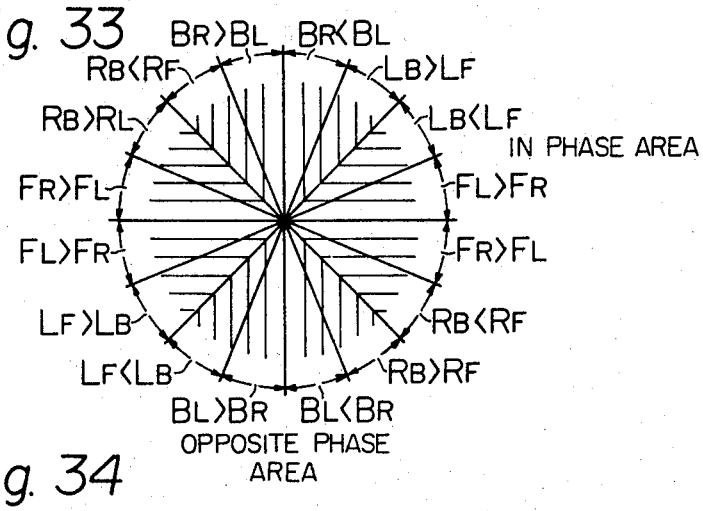

FIG. 28 is a side elevational view of a modified stylus carrying arm and spherical support member therefor;

FIG. 29 is a front elevational view of the stylus carrying arm and spherical support member of FIG. 29;

FIG. 30 is a sectional view of the assembly of FIGS. 28 and 29 mounted within a damped member and a stationary support body;

FIG. 31 illustrates a modified sensitivity response characteristic of a two transducer stereo cartridge which improves the signal separation and rear signal response thereof;

FIG. 32 is a conceptional view of a disc recording system of the invention;

FIG. 33 is a view useful to understand more clearly the system in FIG. 32; and

Figure 34:
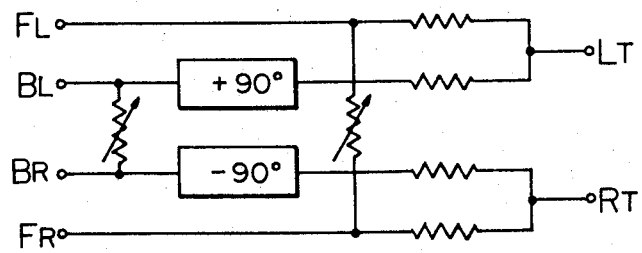
Figure 35:
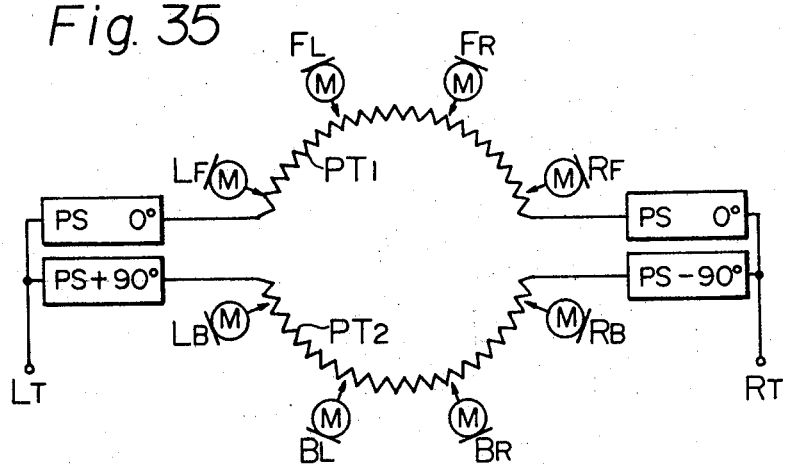

FIGS. 34 and 35 show a prior art recording system.

Figure 1:
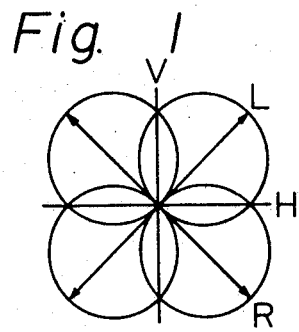
FIG. 1 is a diagram of the overall sensitivity response characteristic (i.e. right and left channel cartridge output versus stylus motion vector angle) of a conventional stereo cartridge.

In the reproduction by the conventional 45-45° disc system, the pick-up cartridge has the overall sensitivity response with respect to movement of the reproducing stylus as shown in FIG. 1. In FIG. 1, reference characters L and R respectively represent the maximum response directions of transducers detecting the movement of the reproducing stylus, said directions bisecting the angle made by the vertical and horizontal axes V and H. As described above, in a 45-45° disc system, signals for the sound sources localized around the listener in any of the 360° directions can be cut into the record track as independent linear vectors in a circular continuous distribution, thereby providing a possible infinite number of channels.

In accordance with a unique theoretical four-channel recording system, a record is cut where the four channels are represented by cutting vectors Rf, Lf, Rb and Lb as shown in FIG. 2. In such case, if four stylus motion detecting transducers are provided having the sensitivity response curves of FIG. 1 are individually arranged on the different axes of the four-channel cutting vectors, if the pick-up cartridge has the response curve (i.e. transducer output versus cutting angle curve) as shown in FIG. 2 about a 3db signal separation between contiguous channels is present.

In accordance with a preferred form of this invention, the stylus motion detecting transducers have sharp or cigar-shaped sensitivity response curves along the respective main detecting axes approximating the ideal sensitivity distribution curves as shown in FIG. 3. These curves show the output generated by the various transducers for various motion vector angles of the stylus and thus are a function not only of the response curve of the transducers but also of the structure positioned between the stylus and the transducers.

Where two signals LT and RT which are fed to the conventional cutter head of a 45-45° cutting system (which cutter head may be used in the practice of the present invention), the signal LT displaces the cutter stylus transversely of the left wall of the sound groove and the signal RT displaces the cutter stylus transversely of the right wall thereof. According to the correlation between these signals, the movement direction of the reproducing stylus can be directed in all directions through 360°. The amplitude of the component of the signal LT originating from a sound source at the left side of a recording area will be greater than the component of the signal RT representing the same source and vice-versa. Thus the signal LT consists mainly of signals picked up from the left hemisphere, and the signal RT consists mainly of signals picked up from the right hemisphere of the recorded sound field.

Figure 4:
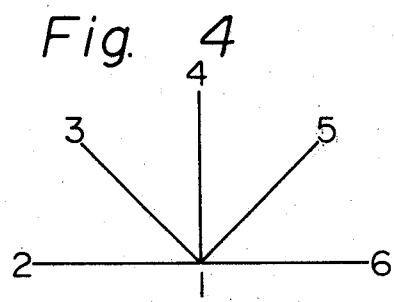
Figure 5:
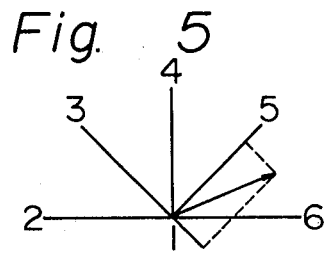

The movement of the cartridge reproducing stylus will be referred to in conjunction with FIG. 4. Assume the angle 3-1-5 is 90° with its center at the line 1-4, then the stylus moves in the direction 1-5 where only the signal LT is recorded and moves in the direction 1-3 where only the signal RT is recorded (in this case, 1-4 is a line perpendicular to the surface of the record). Accordingly, if LT=RT and the signals are in in-phase relation (a sign of equality representing an identical signal level), the cartridge reproducing stylus moves in the direction of line 2-1-6, namely, in the horizontal direction relative to the disc surface. If LT = RT and the signals are in opposite phase relation, the stylus moves in the direction of line 1-4, namely, in the vertical direction with respect to the disc surface. This is the basic principle of the reproduction in the disc recorded by the 45-45° system.

Figure 6:
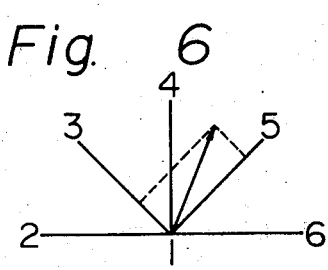

In the meantime, if the signals are in an in-phase relation and LT > RT (a sign in inequality representing the difference in magnitude of a signal level), the stylus moves from the reference point 1 in various directions within the range of the angle 5-1-6. If LT < RT, and the signals are in an in-phase relation, the stylus moves within the angle 3-1-2. If LT > RT and these are in the opposite phase relation, the stylus moves from the reference point 1 within the angle 5-1-4, and if LT < RT and the signals are in opposite phase relation, the stylus moves within the angle 3-1-4 from the point 1, as shown in FIG. 6. These movements are symmetrical with respect to the point 1. Lower quadrants have been omitted from the diagrams but as all movements are around the reference point 1, these are symmetrical to the upper quadrants shown.

Figure 7:
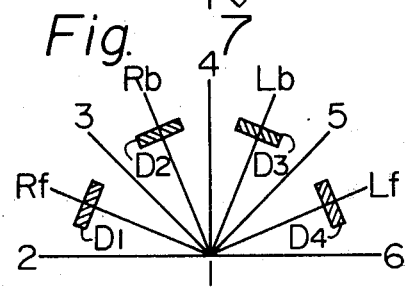

In view of the facts aforedescribed, for the purpose of effecting four-channel reproduction, as an example, supposing the stylus detecting transducers D1, D2, D3 and D4 (FIG. 7) having the sensitivity response curves approximating that shown in FIG. 3 are arranged at respective positions bisecting respective interior angles 2-1-3, 3-1-4, 4-1-5 and 5-1-6 of FIG. 4 (the transducers D1, D2, D3 and D4 being all incorporated in a single cartridge), and assume the signal output to be generated thereby by the movement of the stylus in the direction line of 1-7 in FIG. 7 is represented by Rf in the direction of line 1-8 is represented by RB and in the direction of line 1-9 is represented by Lb, and in the direction of line 1-10 is represented by Lf, the relation between these output signals and the signals fed to the two inputs of a conventional stereo record cutting head are:

$$Lf: \frac{RT}{LT} = \tan 22.5°$$

$$Lb: \frac{RT}{LT} = -\tan 22.5°$$

$$Rf: \frac{RT}{LT} = \tan 22.5°$$

$$Rb: \frac{RT}{LT} = -\tan 22.5°$$

wherein the opposite phase is represented by a minus sign. In this case, if respective transducer detection elements D1, D2, D3 and D4 corresponding to RF, Rb, Lb and Lf are connected so as to detect the in-phase polarity, it follows that all the four signals are all reproduced in-phase. Thus, an ideal reproduced sound field results by the most simplified reproducing system. This is an advantage which can never be achieved in the purely electronic synthesis of conventional technology.

Where a four transducer cartridge of the invention is used in a stereo sound system, the Rf, Rb, Lb and Lf outputs thereof are combined in the following manner and fed to the left and right sppeakers (identified as L and R) in the following manner (see FIG. 7C):

$$L = Lf + Lb$$

$$R = Rf + Rb$$

In a monaural sound system, the various outputs of the four channel cartridge of the present invention are combined by simply adding the four outputs of the cartridge together and feeding the same to the speaker or speakers involved.

In a quadraphonic sound system, the four outputs of the cartridge are preferably fed to crosstalk reduction circuits to be described, in turn connected to the left and right front and rear speakers involved. FIG. 7B shows such a system.

In one of the applications of the present invention, from a four channel recording representing original microphone placement at the right front, left front, right rear and left rear of the room involved, we can also obtain outputs Cf, Cb, CL and CR representing signals which would have been picked up by microphones centered at the front, rear, right and left sides of the room by combining the four cartridge outputs Lf, Rf, Lb and Rb in accordance with the following formulas (which outputs are fed ultimately to speakers CF CB CL and CR centered at the front, rear, left and right of the listening station to form an 8-channel sound field):

$$Cf = Lf + Rf$$

$$Cb = Lb + Rb$$

$$CL = LF + Lb$$

$$CR = Rf + Rb$$

FIG. 7C illustrates such a sound reproducing system.

The various adder and eliminator circuits may be formed as integrated circuits on silicon chips which become an integral part of the cartridge of the present invention. Switching means can be incorporated in the cartridge which switch in the adders where monaural or stereo records are being played and the particular eliminator circuits where a quadraphonic record is being played.

In reproducing the conventional two-channel stereophonic record recorded by the 45-45° system according to a three-channel or more version of this invention, the in-phase components are always reproduced at the front channels and the opposite phase components are reproduced at the rear channels, so that the original sound field is reproduced with an unexpected excellence (unless the disc was poorly mixed at the original recording). Thus, the reproducing system of this invention provides a versatile system useable with existing disc record systems to produce excellent sound quality.

FIGS. 8 through 13 show embodiment of a reproducing cartridge having a practical construction to provide the ideal sensitivity pattern of FIG. 3. In these embodiments a damper assembly of a unique construction is used for enhancing the channel separation. FIG. 8 shows a side view showing a relation of a cantilevered pick-up arm 103 with a damper assembly made of front and rear damper elements 101 and 102 made of an elastomer material, FIG. 9 is a front view thereof, and FIGS. 10 and 11 illustrate a construction of the front and rear damper elements respectively. The cantilevered arm 103 has one end to which is attached a stylus 104 as shown and may be a magnet when operated with the transducer shown in FIG. 13. Generally, the stylus 104 has a longitudinal axis which extends approximately 15° to a vertical line. In the form of the invention now being described, the axis of major sensitivity of the various transducers to be described for best results are located in planes which do not include the longitudinal axis of the stylus 104. The damper elements 101 and 102 which may either be in two separate pieces or molded into one piece, are rectangular in shape and fixed at their periphery to a casing (not shown) in a 90° relationship of their longitudinal axes so as to form a cross, both provided with circular center holes. The cantilevered arm passes through said holes, forming a firm contact therewith so that all mechanical motions are transmitted without loss between the arm and the damper elements.

A simple mechanical analysis should reveal that freedom of motion of the cantilevered arm, for the portion passing through damper element 101, is maximum along axes Lf and Rf but minimum along the vertical axis due to its maximum damping effect in this direction, and that similarly that of the portion through 102 is maximum along axes Lb and Rb but minimum along the horizontal axis.

When the arm moves in directin Lf, for instance, the fulcrum of the motion should be in the neighborhood of 102, the center of damper element 102, due to the latter's greater damping effect along Lf and much greater ease of motion for the portion of the arm within damper element 101. Similarly, when the arm moves along axis Lb, due to ease of the arm motion within damper element 102 and greater damping effect of damper element 101 along this direction, its fulcrum of motion should be in the neighborhood of 101', the center of damper element 101.

By using transducers at the front section of the arm nearer the stylus to pick up Lf and RF motions, the front transducers should detect these signals maximally. Similarly, by using transducer at the rear section of the arm farther away from the stylus, the rear transducers should detect the rear signals Lb and Rb maximally but the said rear signals would hardly be detected by the front transducers due to their shorter distances from the fulcrum 102' of the motion, and consequently the proportionately smaller amplitude of vibration of the arm, in addition to intrinsic low outputs of the front transducers in directions Lb and Rb that are built in by means of suitable spatial relation with yokes, pole pieces, etc. of the transducers. The rear transducers would hardly pick up the front signals due to arm motions in directions Lf and Rf because of their shorter distance from the fulcrum 101' of motion in the first case mentioned above, plus their intrinsic low response in these directions.

Accordingly, front portion 103' of the cantilevered arm 103 in front of the front damper element 101 will, as shown in FIGS. 12 and 13, vibrate opposite transducers D1 and D4 which are to develop the signals for the right front and left front speakers, and rear portion 103'' of the cantilevered arm 103 projecting rearwardly of the rear damper element 102 vibrates opposite the transducers D2 and D3 which are to develop the signals for the right and left rear speakers. The horizontally elongated front damper element 101 acts as a damper primarily in the vertical direction for the front portion 103' of the cantilevered arm and the vertically elongated rear damper 102 acts as a damper primarily in the horizontal direction for the rear portion 103'' of the cantilevered arm 103. This damping action produces a sensitivity response curve having the cigar-shape shown in FIG. 3. Damping element 101 with related transducers D1 and D4 may be interchanged respectively in location with damper 102 with transducers D2 and D3, without any change in performance.

The front signal detecting transducers D1 and D4 mounted opposite the portion 103' of the cantilevered arm 103 in front of the front damper 101 described will have detecting axes which are substantially closer to a horizontal than to a vertical line. These axes may be 22½° from and are on opposite sides of a horizontal line. The rear signal detecting transducers D2 and D3 opposite the portion 103'' of the cantilevered arm projecting rearwardly from the rear damper 102 will have main detecting axes closer to the vertical line than to the horizontal line. Preferably, the axes of the rear transducers D2 and D3 are spaced 22½° from and are on opposite sides of a vertical line.

In the cartridge with the arm construction as shown in FIGS. 8 and 9, arm motion vectors representing signals to be localized in reproduction at the front of the room induce greater displacements than arm motion vectors representing signals to be localized in reproduction at the rear of the room, so that inasmuch as the front signal detecting transducers D1 and D4 are disposed on the front side of the damper assembly and the rear signal detection transducers D2 and D3 are disposed at the rear side thereof in the actual detection, the separation of signals between the front and rear sides will be increased. The separation of signals between the left and right sides of the front as well as the rear depends upon the directional sensitivity response characteristics of the respective transducers as measured by angles $\alpha$ and $\beta$ in FIGS. 10 and 11.

The construction of an embodiment utilizing the damper assembly of this invention are outlined in FIGS. 12 and 13, wherein FIG. 12 shows the construction of a cartridge constituted by movement of transducers directly connected to cantilevered arm 103, (a piezoelectric type, a semiconductor type, a photoconductor type, a capacitor type or the like) and FIG. 13 shows the construction of a cartridge by transducers spaced from the cantilevered arm 103 of a moving magnet type or a moving iron type.

In FIG. 12, transducers D1 and D4 have movement transmission members 111 and 112 corresponding to the detection along the main RF and LF axes respectively. The transducers D2 and D3 have movement transmission members 113 and 14 corresponding to the detection in the RB direction and the LB direction. In FIG. 13, the transducers D1 and D4 associated with the front portion 103' of the cantilevered arm have widely spaced narrow faced core structures 115 and 116 guiding magnetic flux parallel to the main RF and LF axes, so the movement of the arm 103 in directions having components parallel to these fields will induce voltages in output windings 115a and 116a. Likewise, transducers D2 and D3 have widely spaced narrow faced core structures 117 and 118 guiding magnetic flux parallel to the main RB and LB axes so the movement of the arm 103 in directions having components parallel to these fields will induce voltages in output windings 117a and 118a. The cantilevered arm 103 in this embodiment of the invention is, therefore, made of a magnet-forming material. It will be noted in the embodiment of FIG. 12 that the angle made between transmission members 111 and 112 corresponds to $180-\alpha$, and the angle made between members 113 and 114 corresponds to $\beta$.

FIGS. 14 through 17 illustrate a practical construction of the reproducing cartridge according to another embodiment of this invention also having the sensitivity response characteristic approximating the ideal sensitivity pattern of FIG. 3. In this embodiment, the movement of the reproducing stylus is divided into the movement caused by the signals from the front sound sources and that from the rear sound sources, and transducers are disposed at the left and right sides so as to enhance the channel separation between the left and right channels, thereby achieving the four-channel sterophonic reproduction. In detail, FIG. 14 shows a side view of the main major moving parts of the cartridge, and FIG. 15 is a front view thereof. Designated at 120 is a cantilevered arm, at 121 a stylus attached to one end of cantilevered arm 120, at 122 a support member fixedly supporting three transducer operating projections 124, 125 and 126 of magnetic material projecting along the legs of an inverted T so the projections are spaced apart from one another by 90°, and at 123 a damper member. The support member 122 is fixedly connected to cantilevered arm 120 so that the support member 122 and the projections 124-126 projecting therefrom follow the movement of the arm 120. The end of the cantilevered arm 120 passes through an opening of the same size in a damper member 123, which is a body made of rubber-like material which damps the movement of the cantilevered arm 120. The damper member 123 is sandwiched between the front surface 128a of a stationary body 128 and the support member, the end of the cantilevered arm 120 extending into the body 128 where it is anchored in any suitable way. The cantilevered arm 120 is thus cantilevered from the stationary body 128 and vibrates relative thereto in accordance with the stylus motion under the damping influence of damper member 123.

Supposing the center of the movement of support member 122 exists in the crossing portion of the inverted T shaped magnet or magnetic members, then the stylus, when a front central signal generated stylus motion appears, is moved horizontally which causes a pivoted movement of the support member 122 about a vertical axis passing through vertical projection 126. When a rear central signal generated stylus motion occurs, a vertical movement of the stylus takes place which causes the support member 122 to pivot about a horizontal axis passing through the horizontal projections 124-125. Front left signal and front right signal generated stylus motions produce in the horizontal projections 124-125 on the support member 122 movement respectively in the directions represented by the vectors Lf and Rf in FIG. 16. Rear left signal and rear right signal generated stylus motions produce in the vertical portion 126 on the support member 122 movement respectively in the directions represented by the vectors Lb and Rb in FIG. 17. Accordingly, if the magnetic circuit involved is disposed so as to detect movement of the projections 124, 125 and 126 as described, the crosstalk from a rear central signal will be minimum in the front signal responsive transducers responding to vertical stylus motion and the crosstalk from a front central signal will be minimum in the rear signal responsive transducers responding to horizontal stylus motion. Regarding the angle between motion vectors Rf, Lf, Lb and Rb, if the angle between vectors Rf and Lf and the angle between vectors Rb and Lb are more than 45°, respectively, then the cartridge channel separation of more than 3 decibels results.

The damping effect of the damper 123 is such that the angle between the motion vectors Lf and Rf and in a horizontal line as viewed in FIG. 16 is preferably between 22½° and an angle substantially less than 45°. Similarly, the angle between the motion vectors Rb and Lb and a vertical line as viewed in FIG. 17 is between 22½° and an angle substantially less than 45°.

Rear signal generating transducers, like D2 and D3 in FIGS. 12-13, are mounted adjacent or are connected to the vertical projection 126 so that their maximum sensitivity axes (e.g. the directions of the magnetic lines of force in the magnetic embodiment) are respectively in the directions of the motion vectors Rb and Lb as viewed in FIG. 17. A pair of transducers like D1 and D4 shown in FIGS. 12-13 are mounted contiguous to or are connected to each of the horizontal projections 124 or 125, so that the maximum sensitivity axes thereof (e.g. the directions of the magnetic lines of force in the magnetic embodiment of the invention shown in FIG. 13) are respectively in the directions of the motion vectors Rf and Lf viewed in FIG. 16. The corresponding right and left front signal outputs of the pairs of transducers D1 and D2 associated with the horizontal projections 124 and 125 are respectively connected in series additive relationship, to produce resultant right front and left front signal outputs which are respectively coupled through amplifiers to right front and left front speakers. The right rear and left rear signal outputs of the transducers D2 and D3 associated with the vertical projection 126 are respectively coupled to amplifiers or the like to the right and left rear speakers involved.

FIGS. 18 through 21 show a third embodiment of a cartridge for use in reproduction having a construction which produces an overall sensitivity pattern approximating that of FIG. 3.

In this embodiment, the cartridge divides the movement of the reproducing stylus into four radial directions, so as to detect the vector in four directions at the divided point in the direction where the crosstalk is minimum. Designated at 130 is a cantilevered arm mounted in a stationary body 128', at 131 a stylus attached at one end of the cantilevered arm, at 132 a support member bodily movable with the stylus 131 and supporting transducer operating projections DLF', DRF', DLB' and DRB' which are relatively stiff so they follow the movement of the support member 132, and a damper 133.

Each of the transducer operating projections DRF', DRB', DLB' and DLF' which are preferably spaced 45° apart and symmetrically on opposite sides of a vertical line (i.e. a pair being on each side of the line) include axially extending magnet-forming members $132a$, $132b$, $132c$ and $132d$, respectively. Positioned at the same radial position as the magnetic members $132a$, $132b$, $132c$ and $132d$ are transducers D1', D2', D3' and D4'. The transducer associated with each of these magnetic members has a core structure 138 having a pair of spaced core arms 138' and 138'' defining an air gap therebetween positioned in the same radial plane as the associated magnetic member. Accordingly, as the associated magnetic member is vibrated, any radial component of motion imparted to the magnetic member will vary the magnetic reluctance in the vicinity of the air gap, thereby generating a signal in the associated output winding 139. Radial movements are thus maximally sensed by each transducer.

The movement of the reproducing stylus 131 causes the movement of transducer operating projections whose motion vectors in the absence of crosstalk (i.e. interaction between the projections) are indicated by the solid line vectors in FIG. 20. The motion vectors contributed by the crosstalk are indicated by the dotted line vectors. The relative magnitudes of the outputs of these transducers are as follows:

$$VLf\ (D4') = Lf + ½\ Rf + ½\ Lb$$

$$VRf\ (D1') = Rf + ½\ Lf + ½\ Rb$$

$$VLb\ (D3') = Lb + ½\ Rb + ½\ Lf$$

$$VRb\ (D2') = Rb + ½\ Lb + ½\ Rf$$

The effect of this aspect of the invention is referred to in conjunction with FIG. 21. In the drawing, LF and LB represent the positions of the transducer operating elements DLB' and DLF'. Lf and Lb shown in solid lines represent the motion vectors of the elements DLB' and DLF' and Lf indicated by the dotted lines represents the motion vectors created by crosstalk forces on elements DLB'. Firstly, the observation is focused only on the element DLB'. The vector Lf shown by the dotted line, when the motion vector at position LF exerted by the stylus tip is transmitted to the position LB through the axis Rb serving as a rotational axis. Position LB and LF are spaced for example 45° apart on the circumference of a circle with center at the point O, and the following formula is obtained:

$$\frac{1}{\sqrt{2}}\ \vec{Lf} = \vec{Lf}$$

The transducer at the position LB is oriented to have the maximum sensitivity so as to detect the motion vector Lb such that the effect of vector Lf on the transducer at position LB is represented by:

$$\frac{1}{\sqrt{2}} \cdot \frac{1}{\sqrt{2}} \vec{Lf}$$

Accordingly, the crosstalk of vector Lf at LB is decreased to ($\vec{Lf}/2$), viz., to 6 decibels. The crosstalk at the detecting position RB adjacent to position LB is decreased by 6 decibels, similarly to the former.

FIGS. 22 through 25 illustrate a method for eliminating most of the modest degrees of crosstalk in a four channel cartridge of the invention. (However, the invention is useful without the same). This crosstalk elimination of the invention is distinguished from and substantially more effective than the conventional method used in reproduction of multi-channel records, due to the following reasons. Firstly, the cartridge picks up and outputs four separate signals which vary only in strength, or level, depending on the sound source location. Front-rear channel separation is thus increased considerably beyond that obtainable conventionally, and furthermore cancellation of crosstalk with original signals, both of which are identical except in signal levels, is accomplished without such side effects as degraded tonal quality. Additionally, the conventional cartridge with only two transducers, while satisfactorily separating the left and right, cannot segregate the front and rear signals and both outputs have the same levels, so that phase relations between the said signals had to be called upon to effect the unsatisfactorily modest crosstalk reduction through the use of matrices and logic circuits.

In this embodiment of the invention, the original signal and the crosstalk of said original signal are cancelled by using a cartridge having four spaced transducers as described and a circuit cooperating therewith. As above indicated, the cancellation is effected between signals that are identical components except for the signal level, and this is distinguished from that used in prior art matrix circuits or the logic circuit thereof.

FIG. 22 illustrates the original component motion vectors Lf, Lb, Rf and Rb of the stylus, the crosstalk motion vectors caused thereby and the corresponding voltages induced in the four transducers D1, D2 D3 and D4 of the invention. Crosstalk voltages and motion vectors are shown by dashed lines and original voltages and motion vectors by solid lines. Voltages are identified by the character V followed by an identification of the corresponding original or crosstalk motion vector generating the same. The transducer outputs include the summation of the solid and dashed line components. FIGS. 23, 24 and 25 illustrate the various operations performed on the voltages to cancel the original crosstalk in accordance with one crosstalk reduction technique of the invention.

The first step in the elimination of the crosstalk voltages as indicated in FIG. 23 is to intermix the outputs of the left front signal generating transducer D4 and the left rear signal generating transducer D3 where a reduced coupled original voltage VLf− (the minus sign indicating a reduced coupled voltage) will reduce the crosstalk voltage vector VLf′. (In intermrixing the outputs, only a small portion of the original output voltage of one transducer is coupled to the output of other transducers to reduce the crosstalk voltages.) The voltages VRf− and VRf′, VLb− and VLb′, and VRb− and VRb′ oppose to reduce the crosstalk voltages.

It will be noted from FIG. 24 that to reduce the crosstalk contents from the rear signal generating transducers, since the corresponding original and crosstalk voltages VRb-VRb′ and VLb-VLb′ are of opposite phase, only a simple signal intermixing operation is needed to cancel or reduce the crosstalk voltages.

It can be seen from FIGS. 22 and 25 that because the original and crosstalk voltages (VRf-VVRf′ and VLf-VLf′) of the left and right front signal generating transducers D1 and D4 are in-phase, crosstalk reduction is achieved by intermixing these channels with a phase inversion operation.

In cancelling the original crosstalk, there occasionally occurs a secondary crosstalk due to the inter-coupling of the signal channels as descrribed. Although such secondary crosstalk is of the low level signal, the cancellation of said secondary crosstalk is desired, in order for increasing the purity of the resulting output.

An electric circuit as shown in FIG. 26 is suited for carrying out the method for cancelling the original and secondary crosstalk signals by their original signals. In this circuit, crosstalk signals VLf′ and VLb′ are cancelled because of the connection of a resistor R1 between output terminal TLB and TLF respectively of transducers D3 and D4 (or D3′ and D4′). Likewise, crosstalk signals VRf′ and VRb′ are cancelled by the connection of resistor R2 between transducer output terminals TRF and TRB of transducers D1 and D2. Crosstalk signals VLb′ and VRb′ are cancelled by the connection of resistors R5 between transducer output terminals TLB and TRB of transducers D3 and D2.

Crosstalk signal VRf′ is cancelled by the connection of resistor R3 having one end connected to transducer output terminal TLF and the other end to the output of inverter amplifier INV1, whose input is connected to transducer output terminal TRF. Crosstalk signal VLf′ is cancelled by the connection of one end of the resistor R4 to transducer output terminal TRF and the other end thereof to the output of inverter amplifier INV2 whose input is connected to transducer output terminal TLF.

Secondary crosstalk signals are cancelled by the connection of a resistor R6 between the output of the inverter amplifier INV1 and the transducer output terminal TLB, by the connection of resistor R7 between the output of the inverter amplifier INV2 and transducer output terminal TRB, by the connection of a resistor R9 between the output of a buffer amplifier BF1 (whose input is connected to transducer output terminal TRB) and the transducer output terminal TLF, and by the connection of resistor R8 between the output of the buffer amplifier BF2 (whose input is connected to transducer output terminal TLB) and transducer output terminal TRF.

Phase shifter circuit PS3 is connected between transducer output terminal TLB and TLB′ to introduce a +90° phase shift. Phase shifter circuit PS4 is connected between its transducer output terminal TRB and TRB′ to introduce a −90° phase shift, and phase shifter circuits PS1 and PS2 are respectively connected between transducer output terminals TLF-LF′ and RF-TRF′ for establishing a phase shift versus frequency curve of the same given slope as the curves of the rear channel phase shifter circuits. These methods may be extended for cancelling tertiary crosstalk signals caused by intercircuit coupling of signals used to cancel original and secondary crosstalk signals.

Viewing the original crosstalk of FIG. 22, it is found that those signals are in the same or opposite phase between the left front and right rear and between the right front and left rear transducer outputs. FIG. 27 shows an electric circuit for cancelling the crosstalk by the mutual crosstalk in the outputs of diagonally related transducers. FIG. 22 shows that the corresponding crosstalk signals VRf' therein are of opposite phase with each other and so can be cancelled by resistors R10 and R10', and buffer amplifiers B F3 and BF3', connected therebetween. Also, since crosstalk signals VLf' are in the opposite phase relation with each other, they are cancelled by resistors R11 and R11', and buffers RF4 and RF4' coupled between the transducer outputs in which they appear. The crosstalk signals VRb' which are in an in-phase relation are cancelled by resistors R12 and R12' and inverter amplifiers INV3 and INV3', coupled between the transducer outputs in which they appear.

FIGS. 28–30 show a further construction of a cartridge, in which a horizontally extending arm 130 carrying a stylus 131 is connected to a spherical member 135 surrounded by a damper 136 of resilient material encased in a slotted stationary body 137, permitting relative rotational movement between it and the arm carrying support member 135, so as to place the fulcrum of movement of the member 135 at the center of a sphere. The support member 135 or arm 180 operates at least three and preferably four transducers in the manner of the present invention.

As previously indicated, while the present invention primarily deals with a cartridge having three or more transducers oriented along three or more different main detecting axes, as described, two features of the present invention are also applicable singly or in combination to conventional two transducer stereo cartridges, one of which features being that wherein the conventional circular lobed stylus motion vector angle versus transducer output characteristic thereof is reduced in width only on the side thereof nearest the vertical characteristic plane extending parallel to the record groove, as shown in FIG. 31. Signal separation is thereby improved and also the ability of the cartridge to reproduce at lower more realistic levels signals directed from the rear of a room.

The second feature referred to is to vary the usual 90° spacing of the two stereo transducers symmetrically positioned on opposite sides of a vertical plane extending parallel to the record groove to one much less than 90° such as 45°.

In the cartridge of this invention, as previously stated, multi-information is to be detected and reproduced directly from the sound groove of a grooved record, and, therefore, it is strongly desired that to the cutter tip of a cutting machine with which the reproducing stylus can effect the same movement faithfully should be applied input signals by which the cutter tip can be moved in response to an input information so that the reproducing stylus can reproduce such input information correctly and faithfully.

FIG. 34 illustrates a typical recording system, called a QS encoder, for obtaining two signals LT and RT used to drive the cutter tip from four input signals, FL, BL, BR and FR. As is clear from this drawing, in such a system, for example, if signals containing the same information component are applied respectively to FL and BL, or FR and BR, then, because the signals BL and BR are passed through respective phase shifters (+90° and −90°), an undesirable interaction takes place between the out-of-phase components of the signals at the terminals Lt and Rt, and, accordingly the signals LT and RT do not impart such movement to the cutter tip which reproduces the original information faithfully. Therefore, it follows that, in the reproduction, the left-side reproduction sound field between the front left signal FL and the rear left signal BL and the right side reproduction sound field between the front right signal FR and the rear right signal BR will not be reproduced faithfully.

An improved circuit which carries out the functions of the circuit as of FIG. 34 is shown in FIG. 35 in connection with eight microphones FLM, FRM, LFM, RFM, BLM, BRM, LBM and RBM.

FIG. 32 is a conceptional view of a recording system for preventing such a harmful interference between the signals to be applied to the cutter tip as is stated above which arises in conventional techniques. In the drawing, FL and FR are microphones M adapted to collect front left and front right sound signals respectively and are connected at points $P_1$ and $P_2$ respectively onto a potentiometer PTF. One end of this potentiometer is connected to one output terminal LT through a 0° phase shifter PS11, and the other end to the other output terminal RT through a similar 0° phase shifter PS12.

The left potentiometer PTL is divided into two, of which one $PTL_1$ has a movable tap P5 to be connected with a microphone LFM adapted to collect a left front sound signal and the other one $PTl_2$ has a movable tap P6 to be connected with a microphone LBM adapted to collect a left rear sound signal. One end of the first left potentiometer portion $PTL_1$ is connected to the first output terminal LT through a +45° phase shifter PS15, and the other end to the second output terminal RT through a buffer BA11 and a +45° phase shifter PS16. One end of the second left potentiometer portion $PTL_2$ is connected to the first output terminal LT through a buffer BA10 and the phase shifter PS15, and the other end to the second output terminal RT through an inverter INV10 and the phase shifter PS16.

Similarly, the right potentiometer PTR is also divided into two portions $PTR_1$ and $PTR_2$, the portion $PTR_1$ having one end which is connected to the output terminal RT through a −45° phase shifter PS17 and the other end which is connected to the output terminal LT through a buffer BA13 and a −45° phase shifter PS18, as well as a movable tap P7 to be connected with a microphone RFM adapted to receive a right front sound signal.

The portion $PTR_2$ is connected at one end to the output terminal RT through a buffer BA12 and the phase shifter PS17 and at the other end to the output terminal LT through an inverter INV11 and the phase shifter PS18. A microphone RBM, being adapted to collect a right rear sound, is connected to the movable tap P8 of the potentiometer portion $PTR_2$. The last back potentiometer PTB is connected at both ends respectively to the output terminal LT through a +90° phase shifter PS13 and to the output terminal RT through a −90° phase shifter PS14, and, at the same time, to the movable taps P3 and P4 thereof are connected microphones BLM and BRM adapted to collect rear left sound BL and rear right sound BR, respectively. The output terminals LT and RT of this circuit act as the channel input terminals of a two-channel transmission line terminating at the cutter head.

This circuit functions as follows. Of the front sound information, the sound collected by the microphone FLM and the sound collected by the microphone FRM are respectively shifted by the phase shifters PS11 and PS12 through the potentiometer PTF and output in in-phase relation to the channel input terminals LT and RT of the two-channel transmission line. Similarly, with respect to the rear sound information, too, the sound collected by the microphone BLM and the sound collected by the microphone BRM are passed through the potentiometer PTB to the respective phase shifters PS13 and PS14, whereby the sounds are shifted so that, to the output terminal LT, a +90° shifted signal and, to the other output terminal RT, a −90° shifted signal are output in opposite phase relation, respectively. This front sound information or rear sound information consists of sounds emitted from a single sound source, and in the case, too, where these are collected as in-phase sounds by two microphones, the output at LT, RT is the same as in the former case. It is clear, therefore, that it is justifiable even if three or more microphones are connected to the respective potentiometer PTF or PTB. Next, to consider the left side sound information, the sound collected by the microphone LFM alone is +45° shifted by the phase shifter PS15 through the potentiometer portion $PTL_1$ and applied to the output terminal LT, and is also +45° shifted by the phase shifter PS16 and applied to the output terminal RT. The sound collected by the microphone LBM alone is output to the output terminal LT through the phase shifter PS15, but, to the output terminal RT, the sound, in consequence of its being +45° shifted by the phase shifter PS16 after passing through INV10, is output in the form of a −45° shifted signal. That is, in this case, the signals at the output terminals LT and RT are in opposite phase relation. Next, to consider the case where the sounds emitted from one sound source are collected as in-phase sounds by the two microphones LFM and LBM, at this time, the output at the output terminal LT becomes a signal resulting from the outputs of the microphones LFM and LBM being vertically added, thereafter passed through PS15 and always +45° shifted thereby.

However, with respect to the output at the output terminal RT, the signal from the microphone LBM is summed up after passing through the inverter INV10 with the signal from the microphone LFM, so that, when the signal LF > LB, the signal which has passed through PS16 is +45° shifted, and, therefore, the outputs at the output terminals LT and RT are in in-phase relation, while, to the contrary, when the signal LF < LB, the said signal which has passed through PS16 is −45° shifted, and, therefore, the output signals at the output terminals LT and RT are in opposite phase relation.

The same can also be said in the case of the microphones RFM and RBM at the right side portion. FIG. 33 shows the region of movement of the cutter tip due to the output of each microphone in the recording system of this invention using eight microphones.

Accordingly, in the recording system of this invention, left signals and right signals are respectively vertically added for direct sound localization only in in-phase relation or opposite phase relation, and then +45° or −45° shifted in phase to produce signal outputs LT and RT in such a way as not to cause any transmission loss with front signals or rear signals, so that the main signals in quadr-directions, front, rear, right and left, all become only those which, as output signals LT and RT, are in in-phase relation or opposite phase relation or opposite phase relation, it being clear that the point that the sound localization in right and left directions is indefinite as compared with that in front and rear directions, which has been taken as a defective point of conventional systems, will be improved ideally. Further, if the aforesaid cartridge of this invention is used with this recording system, the merits of said cartridge mentioned above can be exhibited more satisfactorily.

It should be understood that numerous modifications may be made in the various forms of the invention depicted in the drawings and described in the specification without deviating from the broader aspects of the invention.

I claim:

1. Reproducing apparatus for producing electrical signals from a grooved disc record where the sides of the groove are oriented at angles of 45° from the vertical, said reproducing apparatus comprising: a stylus holder, a single track stylus on said holder adapted to extend into and follow a single track in a record groove, at least three transducers coupled to said holder and mounted in spaced angular relationship to one another and all responsive to movement of said stylus in various directions for producing electrical signals indicative of the directions of movement imparted to said stylus as the stylus rides in the record groove, said at least three transducers having main detecting axes directed and spaced in three different directions as viewed in a viewing plane or planes to be at right angles to a plane substantially tangent to the record groove and perpendicular to the disc record, and each axis being spaced much less than 90° from the adjacent direction along which the adjacent transducer is responsive to a maximum degree to movement of said stylus.

2. The reproducing apparatus of claim 1 in combination with a corresponding number of speakers positioned in spaced relationship in a room, and means respectively coupling the outputs of at least said three transducers respectively to said three speakers.

3. The combination of claim 1 combined with said grooved record having only two stereo signals recorded thereon.

4. The reproducing apparatus of claim 1 wherein there are at least four transducers having their main detecting axes oriented in four different directions.

5. The reproducing apparatus of claim 4 in combination with a crosstalk reducing circuit including means for interconnecting the outputs of various ones of said transducers having corresponding original or crosstalk signals of the same or of opposite phase, the circuit including means for adding together the corresponding original or crosstalk signals when they are in opposite phase, and means for phase inverting one of the original or crosstalk signals of one of the transducer outputs and adding the same to the corresponding original or crosstalk signals originally of the same phase in the other transducer output.

6. The reproducing apparatus of claim 4 in combination with a crosstalk reducing circuit including means for coupling a small portion of the output of the left and right front speaker driving transducers to one another through phase inverters and voltage reducing means, so corresponding in-phase original and crosstalk signals cancel one another, means interconnecting the outputs of the left and right rear speaker driving transducers through voltage reduction means so corresponding opposite phase original and crosstalk signals cancel one another, and means respectively interconnectitng the outputs of the left front and left rear and right front and right rear speaker driving transducers through voltage reducing means so corresponding opposite phase original and crosstalk signals cancel one another.

7. The reproducing apparatus of claim 4 in combination with a crosstalk reducing circuit comprising: means for coupling a fractional portion of the output from each of the left and right rear speaker driving transducers to the other of same, whereby the corresponding opposite-phase crosstalk components thereof cancel one another, and means coupling a fractional portion of the output of each of the right rear and left rear speaker driving transducers separately through inverter circuits respectively to the output of the left front and right front speaker driving transducers, where the corresponding crosstalk signals are in-phase for effecting a cancellation of the corresponding crosstalk signals.

8. The reproducing apparatus of claim 4 wherein the main detecting axes of the pair of transducers which are to generate signals for the left and right front speakers fall in a common plane which is not parallel to the plane in which the main detecting axes of the other pair of transducers fall.

9. The reproducing apparatus of claim 4 wherein a pair of said transducers are to generate signals for a pair of right and left front speakers, said pair of transducers having main detecting axes which are spaced much closer to a horizontal line than to a vertical line, and wherein there are a second pair of transducers which are to produce signals for the left and right rear speakers, the latter pair of transducers having main detecting axes spaced much more closely to a vertical line than to a horizontal line.

10. The reproducing apparatus of claim 9 wherein the main detecting axes of the pair of transducers which are to produce signals for the left and right front speakers are spaced approximately 22 ½° from a horizontal plane and the main detecting axes of the transducers which are to produce signals for the left and right rear speakers are spaced approximately 22 ½° from a vertical plane extending parallel to the record groove.

11. The apparatus of claim 9 combineed with a pair of speakers positioned at the left and right of the front of a room, a second pair of speakers respectively positioned at the left and right of the rear of the room, means respectively coupling the outputs of the pair of transducers whose main detecting axes are positioned more closely to a horizontal line than to a vertical line respectively to the left and right front speakers, and means respectively coupling the outputs of the other two transducers to the left and right rear speakers.

12. The combination of claim 11 combined with a grooved record in which the stylus of the reproducing apparatus extends, which grooved record has signals recorded on 45° angle surfaces oriented on opposite sides of a vertical plane, there being four channels of information recorded on said grooved surfaces representing the outputs from microphones spaced at four different positions in the room in which the recording was made.

13. The combination of claim 11 combined with a grooved record in which the stylus of the reproducing apparatus extends, which grooved record has signals recorded on 45° angle surfaces oriented on opposite sides of a vertical plane, there being two channels of information recorded on said grooved surfaces representing the outputs from microphones spaced at two different positions in the room in which the recording was made.

14. The recording apparatus of claim 4 wherein there is provided a cantilevered arm from one end portion of which said stylus depends, a support member carried on said cantilevered arm for bodily movement therewith, said support member carrying at least a pair of projections extending in different directions symmetrically related to a vertical plane to extend tangent to the record groove, the movement of said support member imparting movement to said projections extending therefrom, and there being two pairs of said transducers respectively mounted opposite to said respective projections.

15. The reproducing apparatus of claim 14 in combination with a pair of speakers positioned at the left and right of the front of a room, and a pair of speakers positioned at the left and right of the rear of the room, means respectively coupling the outputs of one of said pairs of transducers in electrical driving relation to said left and right front speakers, and means respectively coupling the outputs of the other two transducers in electrical driving relation to the left and right rear speakers.

16. The reproducing apparatus of claim 14 wherein said support member is damped for providing an output versus stylus motion vector angle characteristic which has cigar-shaped lobes respectively extending in the direction of said main detecting axes.

17. The reproducing apparatus of claim 14 wherein said support member is spherical and is mounted for a universal movement in a spherical body of resilient material.

18. The reproducing apparatus of claim 1 wherein there are means operatively coupling the stylus movement into operative relation with said transducers for providing an overall response characteristic of said transducers having a highly elongated elliptical shape where the major axis thereof extending along said main detecting axis thereof is in the neighborhood of at least about twice the minor axis thereof to provide a cigar-shaped response pattern.

19. The reproducing apparatus of claim 18 wherein said cigar-shaped lobes of said curve are provided by a damped structure carrying said stylus at the end thereof.

20. The reproducing appartus of claim 18 wherein said coupling means includes a damper structure including a generally cantilevered arm from which said stylus depends.

21. The reproducing apparatus of claim 20 wherein said coupling means includés a support member connected to said cantilevered arm extending into a fixed stationary support body, and damping means made of a rubber-like material sandwiched between said support member and said stationary support body.

22. The reproducing apparatus of claim 18 wherein said coupling means includes a cantilevered arm with said stylus mounted on one end thereof to extend into the record groove, damper means forming a stationary support for the arm at a point intermediate the ends thereof, said damper means having longitudinally spaced sections, one of said damper sections damping the motion of one end of the arm to a maximum degree in a first direction permitting appreciably freer movement of the adjacent portion of the arm in first opposite directions at an angle to said first direction, and the other damper section damping movement of the opposite end of the arm to a maximum degree in a second direction at right angles to said first direction, permitting appreciably freer movement thereof in second opposite directions at an angle to said second direction and separate transducer means responsive to a maximum degree to the movement of said arm respectively in said first and second opposite directions.

23. The apparatus of claim 22 wherein said damper means is positioned at a point substantially closer to one end of the arm than the other end of the arm, so that one end of the arm is freer to vibrate than is the opposite end of the arm, a pair of transducers which are to generate signals for either the left and right front or rear speakers and positioned to detect movement of the portion of the arm projecting the greater distance from the damping means, and the pair of transducers which are to generate signals to be fed to the other of same being mounted opposite the portion of the arm which projects the least amount from the damper means.

24. The reproducing apparatus of claim 1 wherein said holder includes a cantilevered arm, said stylus tip is mounted on the free end of said arm, said transducers including a detecting assembly having three projections, said projections being fixedly supported on a support member mounted on said arm in spaced relation to said stylus tip and bodily movable therewith, one of said projections vertically extending from the supporting member in the opposite direction as that of the stylus tip and the other two projections laterally extending from the supporting member on opposite sides of a vertical plane to be tangent to the record groove, and a separate electrical signal generating means mounted in operative relation to each of said projections and responsive to a maximum degree to the movement of the projections in a circumferential direction for providing corresponsing electrical signals.

25. The four channel cartridge of claim 24 wherein said other two projections on said support member extend horizontally from opposite ends of said support member, vertical movement of the stylus tip resulting in a pivotal movement of the support member about a horizontal axes coextensive with the said other projections, and lateral movement of the stylus tip resulting in pivotal movement of said support member along an axis coextensive with said vertical projection.

26. The four channel cartridge device of claim 25 wherein said support member is mounted for bodily movement upon a cantilevered arm from the end of which said stylus tip depends, the other end of said cantilevered arm extending into a stationary support body, and a resilient member sandwiched between said support member and said stationary support body which damps the movement of said support member in said directions of pivotal movement thereof.

27. Reproducing apparatus for producing electrical signals from a grooved disc record where the sides of the groove are oriented at angles of 45° from the vertical, said reproducing apparatus comprising: a stylus holder, a single track stylus on said holder adapted to extend into and follow a single track in a record groove, at least two transducers mounted in spaced angular relationship to one another and both responsive to movement of said stylus in various directions for producing electrical signals indicative of the directions of movement imparted to said stylus as the stylus rides in the record groove, said two transducers havng main detecting axes spaced on opposite sides of a vertical plane to be tangent to the record groove and perpendicular to the disc record and making a similar angle therewith, each of said transducers including means for providing an overall response characteristic of said transducers and any structure carryng the stylus with comprises lobes projecting in the direction of said main detecting axes and having a highly elongated elliptical shape where the major axis thereof extending along said main detecting axis thereof is in the neighborhood of at least about twice the minor axis thereof to provide a cigar-shaped response pattern.

28. The reproducing apparatus of claim 27 wherein the main detecting axis of each of said transducers make an angle with said vertical plane of much less than 45°.

29. A four-channel cartridge device for use with a grooved record comprising: a cantilevered arm, a stylus tip fixedly mounted at the one end of said arm and adapted to extend into and follow a single track in a record groove, a stylus tip motion detecting means including a support member bodily movable with said stylus tip and having four projections extending in different radial directions as viewed in a viewing plane or planes to be at right angles to a plane substantially tangent to the record groove and perpendicular to the disc record, and each axis being spaced apart much less than 90° from the adjacent of said directions, and a separate transducer means mounted opposite each of said projections and responsive to a maximum degree to radial movement of the associated projection.

* * * * *